United States Patent

Rohlf et al.

[11] Patent Number: 6,153,040
[45] Date of Patent: Nov. 28, 2000

[54] GYPSUM BOARD PAPER THAT REDUCES ROLL UP DURING LAMINATION, AND BOARD COMPRISING SUCH PAPER

[75] Inventors: Evan V. Rohlf, Dundee; Dick C. Engbrecht, Arlington Heights; Mark B. Scalf, Mc Henry, all of Ill.

[73] Assignee: United States Gypsum Company, Chicago, Ill.

[21] Appl. No.: 09/080,081

[22] Filed: May 15, 1998

[51] Int. Cl.[7] .................... B32B 13/00; B32B 13/08; B32B 31/12

[52] U.S. Cl. ................ 156/281; 156/39; 156/44; 156/45; 156/278; 427/209; 427/391; 427/395; 427/401; 427/445; 428/486; 428/537.7; 428/703

[58] Field of Search ............... 156/39, 41, 44, 156/45, 278, 60, 281; 427/209, 401, 445, 384, 385.5, 391, 395; 428/484, 537.7, 703, 486

[56] References Cited

U.S. PATENT DOCUMENTS

| | | | |
|---|---|---|---|
| 2,560,521 | 7/1951 | Camp | 428/486 |
| 2,819,986 | 1/1958 | Edwards et al. | 428/486 |
| 3,389,042 | 6/1968 | Bieri et al. | |
| 3,607,486 | 9/1971 | Jacks | 156/41 |
| 3,692,620 | 9/1972 | Schmidt et al. | 428/537.7 |
| 3,694,298 | 9/1972 | Veschuroff et al. | |
| 4,051,291 | 9/1977 | Long | |
| 4,057,662 | 11/1977 | Johnson et al. | 427/209 |
| 4,195,109 | 3/1980 | Long | |
| 4,204,030 | 5/1980 | Takamizawa et al. | 427/209 |
| 4,350,736 | 9/1982 | Reily | 428/537.7 |
| 4,544,424 | 10/1985 | Take et al. | |
| 4,776,970 | 10/1988 | Hayashi et al. | 252/49.5 |
| 5,085,929 | 2/1992 | Bruce et al. | |
| 5,198,052 | 3/1993 | Ali | |
| 5,552,187 | 9/1996 | Green et al. | 427/389.8 |

FOREIGN PATENT DOCUMENTS

| | | | |
|---|---|---|---|
| 57-38385 | 3/1982 | Japan | 427/385.5 |
| 558679 | 1/1944 | United Kingdom | 427/401 |
| 695044 | 8/1953 | United Kingdom | 156/41 |

OTHER PUBLICATIONS

Coefficient of Static Friction of Shipping Sack Papers, TAPPI, 1984, 2 pgs.

Primary Examiner—Steven D. Maki
Attorney, Agent, or Firm—Greer, Burns & Crain, Ltd.; David F. Janci; John M. Lorenzen

[57] ABSTRACT

A process for reducing rollups in gypsum board panels when the panels are laminated with a laminate, is provided. A laminator is provided, as is at least one gypsum board panel, each panel having a face paper layer and a backing paper layer. Each paper layer has a coefficient of friction, and at least one of the face paper layer and the backing paper layer is treated with an agent for reducing the coefficient of friction and water absorbency. Next, a supply of laminate is provided and installed in the laminator. Then, at least one panel of the gypsum board is fed through the laminator, so that a layer of the laminate is applied thereon.

10 Claims, 1 Drawing Sheet

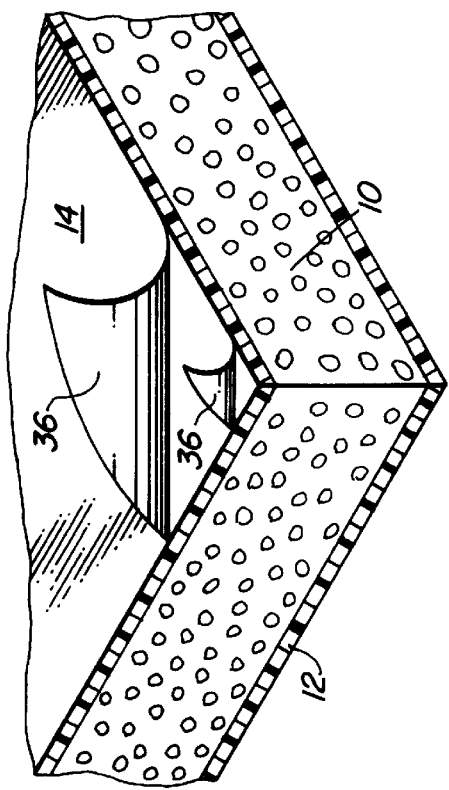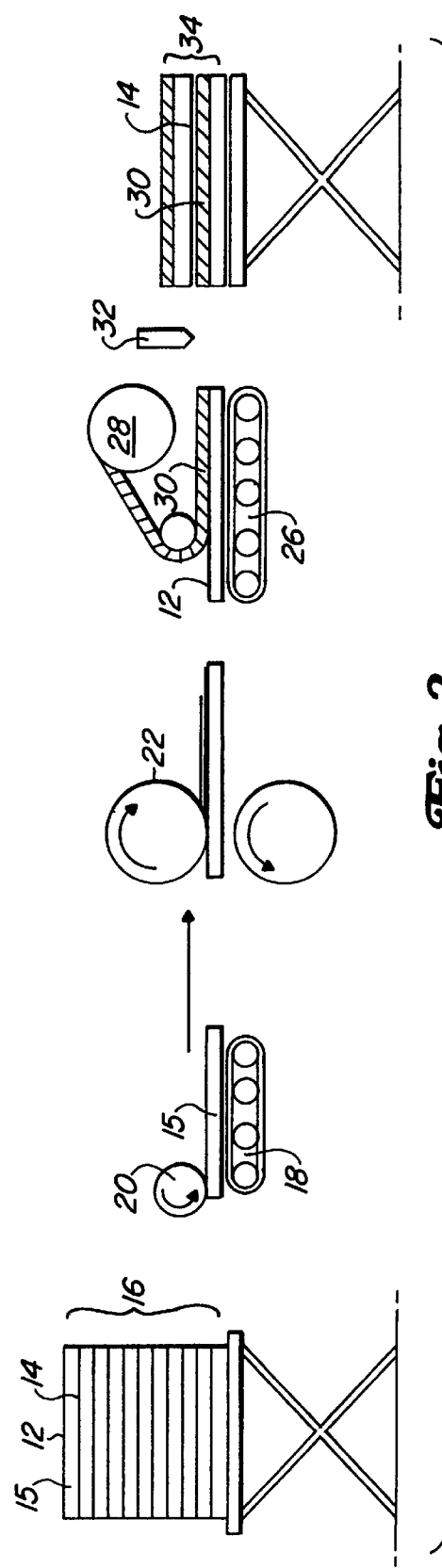

GYPSUM BOARD PAPER THAT REDUCES ROLL UP DURING LAMINATION, AND BOARD COMPRISING SUCH PAPER

BACKGROUND OF THE INVENTION

The present invention relates to the manufacture of gypsum board panels, and more particularly, to a means by which the frequency of delamination of gypsum board paper during lamination of gypsum board panels can be greatly reduced.

Gypsum board panels, in their simplest form, consist of a thin, flat slab of gypsum sandwiched between layers of gypsum paper. Usually, one side of the panel is made with a light-colored, smoothly textured paper, which is referred to as the face paper or the manila paper layer. The other side of the panel is usually made with a darker, less smoothly-textured paper, which is referred to as the backing paper or the newslined paper layer.

For decorative purposes, various films are laminated to the face surface of gypsum board panels. In typical applications, the laminated boards are provided with an exterior pattern that resembles wallpaper. These laminated panels are used in the manufactured housing industry for making interior walls in mobile homes, among other things.

The gypsum board panels are conveyed through a laminator by conveyor drive belts. A major drawback of the conventional laminating process is that a shear differential exists between the gypsum panel and the conveyor drive belts. This shear differential frequently causes the plies of the gypsum board panel's backing paper layer to delaminate as the panels are conveyed through the laminator. Such delaminations are referred to as rollups. Rollups occur even more frequently when gypsum board panels are shipped to the laminating facility hot, or when laminating is performed during hot and/or humid weather. The problem of rollups is exacerbated by the fact that many facilities are located near manufactured housing plants, which are concentrated in the southern United States, a region having a relatively hot and humid climate.

After passing through the laminator, the gypsum board panels are stacked face to back, one on top of the other. As such, any rollups in the backing paper layer of one panel often cause indentations in the face of the panel upon which it is stacked. Gypsum board panels with indentations in their face are often rejected, and are unsuitable for sale. The conventional way to address the rollup problem is to discard the panels. Due to the large number of rollups currently occurring in the gypsum board panel lamination industry, a process which reduces the frequency of such rollups can result in greater efficiency in the use of the panels, and significant savings for the laminator.

Thus, it is an object of the present invention to provide an improved process for reducing rollups in gypsum board panels when the panels are laminated with a laminate.

It is another object of the present invention to provide an improved gypsum board panel which will be less susceptible to delamination of its paper layers during the lamination process.

It is yet another object of the present invention to provide an improved process for making gypsum board paper that will be less susceptible to delamination during the lamination process.

SUMMARY OF THE INVENTION

The above objects are met or exceeded by the present process for laminating gypsum board panels, which involves the use of an agent featuring the ability to reduce the coefficient of friction and/or the water absorbency of a panel's paper layer. As a result, the present process significantly reduces the shear differential between the paper layer and the conveyor belts used to carry gypsum board panels through a laminator. With less shear force generated during lamination, a corresponding reduction is achieved in the frequency of rollups of the paper layer. While the preferred target paper layer is the backing paper layer, it is also contemplated that rollups of the face paper layer may be reduced by applying the agent to the face paper layer.

More specifically, a process for reducing rollups in gypsum board panels when the panels are laminated with a laminate, is provided. A laminator is provided, as is at least one gypsum board panel, each panel having a face paper layer and a backing paper layer. Each paper layer has a coefficient of friction, and at least one of the face paper layer and the backing paper layer is treated with an agent for reducing the coefficient of friction and water absorbency. Next, a supply of laminate is provided and installed in the laminator. Then, at least one panel of the gypsum board is fed through the laminator, so that a layer of the laminate is applied thereon.

In the preferred embodiment, gypsum board panels are provided, having a backing paper layer which has had its coefficient of friction reduced through treatment with a low friction agent. Also preferred is that the agent be applied to the top side of the backing paper layer at a rate in the approximate range of 0.05–0.20 lb/MSF, where MSF=1000 ft² of board. Depending upon the porosity of the paper being coated, however, it is contemplated that application of the agent at rates ranging from 0.01 lb/MSF–1.0 lb/MSF would achieve the desired reduction in coefficient of friction.

Application of a friction reducing agent in these amounts operates to reduce the coefficient of friction of the backing paper layer, thus rendering the paper less susceptible to rollups during lamination. The agent used also retards the absorption of moisture by the gypsum board produced using the treated paper.

DESCRIPTION OF THE DRAWINGS

FIG. 1 is a fragmentary top perspective view of a gypsum board panel; and

FIG. 2 is a diagrammatic view of the gypsum board panel lamination process.

DESCRIPTION OF THE PREFERRED EMBODIMENTS

Referring now to FIG. 1, a top perspective view of a corner of a gypsum board panel is illustrated. Gypsum board panels, in their simplest form, consist of a thin, flat core of gypsum 10 enclosed in between layers of gypsum paper 12, 14. Such panels are commonly manufactured by placing a slurry of calcined gypsum, water, and known additives between parallel sheets of backing paper 14 and face paper 12, allowing the calcined gypsum to set, and then heating the resulting panel to drive excess water from the gypsum core. The basic technology of gypsum wallboard manufacture is disclosed in U.S. Pat. Nos. 1,500,452; 2,207,339; and 4,009,062, all of which are incorporated by reference herein.

For decorative purposes, various films are laminated to the face surface of the panels, which often provides the panels with an exterior pattern resembling wallpaper. Gypsum board panels are used in the manufactured housing industry for making mobile homes, among other things.

Referring now to FIG. 2, a conventional gypsum board panel laminating line is illustrated diagrammatically. Gypsum board panels 15 having a face paper layer 12 and a backing paper layer 14 are taken from a stack of panels 16 and fed face-up onto a conveyor belt 18. A rotating pinch roller 20 forces the panel along a conveyor belt 18 toward a laminating roll 28. As the panel 15 passes the laminating roll 28, an adhesive coated laminate film 30 is applied to the panel's face paper layer 12. Alternatively, adhesive may be applied to the surface of the panel's face paper layer 12 by an adhesive applicator 22, prior to application of the laminate film 30. Finally, once the panel's face paper layer 12 has been fully laminated, the laminate film 30 is cut, as depicted at 32. Laminated panels are then stacked at 34, one on top of the other, with the back paper layer 14 of one panel resting on the laminate film 30 covered face paper layer 12 of the panel directly underneath.

In the conventional laminating process, a shear differential between the conveyor belts 18, 26 and the backing paper layer 14 of the panels being conveyed causes frequent rollups 36 (best seen in FIG. 1) of the backing paper layer. This problem is exacerbated when the gypsum board panels which are being laminated are above room temperature, which they frequently are, and/or when lamination is being done in hot, humid conditions, which it frequently is. As laminated panels are stacked, rollups in the back face of one can cause indentations in the face surface of the panel directly underneath. Gypsum board panels with indentations in their face are often rejected, and are unsuitable for sale.

An important feature of the present invention is the treatment of gypsum board paper with an agent for reducing its coefficient of friction, either before or after such paper has been converted into a gypsum board panel. Such treatment results in a reduction in the shear force which develops between the backing paper layer 14 of a gypsum board panel and the conveyor belts 18, 26 used to carry such panel during the lamination process. Suitable friction-reducing agents are those which are applicable as a film upon the paper or panel and which will not detract from the known condition or desired properties of the gypsum board.

Specific examples of suitable friction reducing agents include: paraffin wax emulsions wherein the paraffin wax has a melting point between 120 and 160° F.; microcrystalline wax emulsions wherein the microcrystalline wax has a melting point between 130 and 200° F.; long and branched chain aliphatic emulsions made from at least one of paraffin wax having a melting point between 120 and 160° F. and microcrystalline wax having a melting point between 130 and 200° F.; long and branched chain aliphatic dispersions made from at least one of petroleum-based and polyethylene-based products; hydrophobic silicone emulsions and hydrophobic silicone resins, such as any of those disclosed in U.S. Pat. No. 3,389,042, which is incorporated by reference herein; polyurethane emulsions and polyurethane water dispersible colloids, such as GRAPHSIZE® brand polyurethane emulsion, available from Vinings Industries Inc., Atlanta, Ga. 30339; styrene maleic anhydride copolymers; fluorochemical phosphates and flourochemicals polymerized with at least one of hydrophilic and hydrophobic co-monomer, such as SCOTCHBAN® brand Paper Protector fluorochemical product, available from 3M, Minneapolis, Minn.; complexes of long chain fatty acids such as myristic acid and stearic acid, having a carbon chain length from 10 to 18, with a preferred length ranging from 12 to 16, and being based on one of chromium and aluminum; alkyl ketene dimer having a carbon chain length of 30–34, such as HERCON 40® brand alkyl ketene dimer, available from Hercules Inc., Wilmington, Del. 19894-0001; 85–99% hydrolyzed polyvinyl alcohols having a viscosity of less than 150 cp at 2% solution, such as AIRVOL® brand polyvinyl alcohol, available from Air Products and Chemicals, Inc., Allentown, Pa. 18105; methyl celluloses, having a viscosity of less than 150 cp at 2% solution, such as ET-466 Methylhydroxyl propyl cellulose, available from Dow Chemical USA, Midland, Mich.; and natural gums with lubricating properties, such as Guar Gum, Jaguar® brand lubricating gum, and Lycoid® brand lubricating gum, all of which are available from Rhone-Poulenc, Kennesaw, Ga. 30144.

The desired properties of the agent are lubrication and water repellency, the latter also referred to as sizing. In the preferred embodiment, Michem Emulsion 61335-D, a commercially available wax emulsion, is used ("Michem 61335"). This product is manufactured by Michelman, Inc., 9080 Shell Road, Cincinnati, Ohio 45236. In the tests described below, Michem 61335 was applied as the friction reducing agent, at varying rates, and to a variety of backing papers. However, it is contemplated that the agent may also, or alternatively, be applied to face paper prior to the face paper being applied to a gypsum sheet, or to the face paper layer 12 of gypsum board panels, in the event that face paper rollups become a problem.

It has also been found that, in some cases, additional defoamer is needed in the paper making process when various emulsions or dispersions are applied. The amount of defoamer required varies with the application, local conditions and the amount of surfactants used to manufacture the emulsion which is applied to the paper.

Treatment of gypsum board paper with an agent to reduce its coefficient of friction may take place prior to such paper being converted into a gypsum board panel. A supply of gypsum board paper is provided, which can be made in the conventional way, involving: pulping up waste paper constituents of old corrugated cardboard, or kraft cuttings and waste newsprint; cleaning, screening, and refining the suspended materials in water suspension; and dewatering the plies. Then, prior to the paper being wound onto the hope reel, or final reel on a paper making machine, a coating of a friction-reducing agent of the type described above is applied to the entire top surface of the paper. As stated previously, there are a number of agents which could be suitable for this purpose. In the preferred embodiment, however, Michem 61335 is used.

The quality of the backing paper used may have an effect on the amount of friction reducing agent required to achieve a given coating rate. For example, when more porous backing papers were coated, a greater quantity of Michem 61335 was required in order to achieve the desired coating rate.

The rate at which the friction reducing agent is applied to the gypsum board paper is important. Several different rates of applying a coating of Michem 61335 wax emulsion to gypsum board backing paper were tested. In the initial trial, backing paper was coated with Michem 61335 wax emulsion at a rate of 0.42 lb/MSF. This, however, resulted in problems later, both during the process of converting the coated paper into gypsum board panels, and in moving and transporting such panels, once formed. More specifically, panels made with backing paper coated at this rate tended to slide too easily, both when being conveyed on conveyor belts during the conversion process, and when being transported in stacks after conversion. This excessive sliding is unsuitable for efficient handling, shipping and/or laminating.

In subsequent trials, lower application rates were tested, to see if the problem of excessive sliding could be overcome. Rates of application of the agent in the range of 0.01 lb/MSF to 0.42 lb/MSF were evaluated. Although the actual coating process ran well regardless of the rate of application, it was found that if the agent was applied to the paper at rates higher than 0.2 lb/MSF, the paper became too slippery, again resulting in problems later, both during the process of converting the coated paper into gypsum board panels, and in moving and transporting such panels, once formed.

At higher coating rates, problems were also observed in the quality of panels produced. As the wax coating is applied to one side of the paper only, applying too much agent caused the paper to stress unequally when converted into a gypsum board panel, which sometimes resulted in a wave in the backside of that panel. It has been found that keeping coating rates below 0.2 lb/MSF appears to be the key to eliminating problems associated with the panels becoming too slippery, and also seems to eliminate waves in the panels. In the preferred embodiment, Michem 61335 was applied to gypsum board paper at a coating rate in the range of 0.05–0.15 lb/MSF. Depending upon the porosity of the paper being coated, however, it is contemplated that application of the agent at rates ranging from 0.01 lb/MSF–1.0 lb/MSF would achieve the desired reduction in coefficient of friction.

The present invention also contemplates that it would be possible to apply a coating of a friction reducing agent to gypsum board paper after such paper has been converted into a gypsum board panel.

Regardless of at what point in the process the paper of a gypsum board panel is treated with a friction reducing agent, an important feature of the present invention is that such treatment can effectively reduce the frequency of rollups of a paper layer of the panel during the lamination process. A number of tests were performed on various types of gypsum board papers, using Michem 61335 applied at varying rates, as a friction reducing agent.

Table I shows the results obtained from testing a number of gypsum board papers, coated with Michem 61335 wax emulsion at varying rates, for propensity to rollup during lamination. The Gypsum Ohio and Jax Grayback paper relate to paper making plants owned by U.S. Gypsum Company, the assignee of the present invention. The lamination occurred in Hartselle, Ala. In order to create a worst-case scenario for rollups, the panels being laminated were all hot to the touch, or above room temperature, and were packaged for shipment to the laminator immediately after manufacture in New Orleans, La., to retain heat.

As Table I indicates, treatment of gypsum paper with Michem 61335 has an effect on that paper's "slide angle," which is directly related to the paper's coefficient of static friction. A slide angle was measured for the paper used in each of the categories of gypsum board panels tested, using the "inclined plane method," as described in publication T 503 om-84, by the Technical Association of the Pulp and Paper Industry® 1984, which is hereby incorporated by reference. Once measured, a slide angle for a surface can be used to obtain, for comparative purposes, the coefficient of static friction for that surface according to the following formula:

coefficient of static friction=slide angle/55.98

Thus, the lower a surface's slide angle is, the lower that surface's coefficient of static friction. In order to achieve a reduction in frequency of rollups, a preferred range for the coefficient of friction is between 0.21 and 0.32 which using the above formula corresponds to a slide angle of between 11.75 and 17.9 degrees. As the results in Table I indicate, gypsum board paper treated with Michem 61335 wax emulsion consistently had a lower slide angle, and thus a lower coefficient of static friction, than untreated paper.

At a previous trial, where gypsum board backing paper was coated with Michem 61335 at a rate of 0.42 lb/MSF, a slide angle of 11° was attained. As mentioned earlier, paper coated at this rate was too slick to properly convert into gypsum board at the panel-making stage, and therefore, a slide angle of 11° is too low. As the results in Table I indicate, treating backing paper with Michem 61335 at rates lower than 0.42 lb/MSF results in a higher slide angle. As the application rate was increased from 0.1 lb/MSF to 0.3 lb/MSF, slide angle ranged from 14° to 15°, and the number of rollups decreased significantly. Regardless of the rate of application, panels made with treated paper had less rollups than panels made with untreated paper. However, as discussed previously, depending upon the porosity of the paper being used, applying Michem 61335 at rates above 0.2 lb/MSF can cause panels to become too slippery, resulting in problems during the process of converting the coated paper into gypsum board panels, and in moving and transporting such panels once formed. In the preferred embodiment, the slide angle is approximately 14° and Michem 61335 was applied to gypsum board paper at an application rate in the range of 0.05–0.20 lb/MSF. Depending upon the porosity of the paper being coated, however, it is contemplated that application of the agent at rates ranging from 0.01 lb/MSF–1.0 lb/MSF would result in the desired slide angle being achieved.

TABLE I

| Backing Paper Used | Treated With | Backing Paper Layer (# rollups/ sheets tested) | Face Paper Layer (# rollups/ sheets tested) | Slide Angle (degrees) |
|---|---|---|---|---|
| regular paper | — | 37/60 | 6/60 | 18 |
| Gypsum Ohio paper | — | 40/60 | 0 | n/a |
| Jax Grayback paper | — | 25/60 | 0 | n/a |
| regular paper | 0.1 lb/MSF Michem 61335 | 20/60 | 0 | 14 |
| regular paper | 0.2 lb/MSF Michem 61335 | 1/60 | 0 | 14 |
| regular paper | 0.3 lb/MSF Michem 61335 | 0 | 0 | 15 |

Results from a second set of tests, taking place this time at a laminating facility in Phoenix, Ariz., are shown in Table II. Again, the panels being laminated were all hot to the touch, or above room temperature, and, except for the control, were made with backing paper treated with a Michem 61335 wax emulsion. For each set of conditions, one lift, or stack of 60 panels, was run through the laminator in the "with" direction, which refers to the direction corresponding to that with which paper is applied to the gypsum of the panel manufacturing process. Also, one lift was run through in the reverse or the "against" direction. Again, the results indicate a reduction in frequency of rollups when, prior to lamination, the backing paper layer of a gypsum board panel is treated with an agent to reduce its coefficient of friction. The high number of rollups observed for the lift of 0.025 lb/MSF backing paper layer "against" may be due to the fact that the lift of boards appeared to be somewhat misshaped or "cupped".

TABLE II

| Backing Paper Used | Treated With | Backing Paper Layer "with" (# rollups/sheets tested) | Backing Paper Layer "against" (# rollups/sheets tested) | Face Paper Layer "with" (# rollups/sheets tested) | Face Paper Layer "against" (# rollups/sheets tested) |
|---|---|---|---|---|---|
| regular paper | — | 70/60 | 110/60 | 20/60 | 60/60 |
| regular paper | 0.025 lb/MSF Michem 61335 | 14/60 | 165/60* | 35/60 | 1/60 |
| regular paper | 0.05 lb/MSF Michem 61335 | 13/60 | 10/60 | 11/60 | 7/60 |

*This lift of boards appeared to be "cupped", or somewhat misshapen, prior to lamination, which may explain the high number of rollups observed.

The results shown in Tables I and II demonstrate that treating gypsum board paper with a friction reducing agent, prior to lamination of such panel, can have a direct effect on the number of rollups which occur. When Michem 61335 was used as the friction reducing agent, satisfactory results were obtained over a range of application rates. In the preferred embodiment, Michem 61335 was applied at a rate of between 0.05–0.20 lb/MSF, in order to obtain a slide angle of approximately 14°. Depending upon the porosity of the paper being coated, however, it is contemplated that application of the agent at rates ranging from 0.01 lb/MSF–1.0 lb/MSF would result in the desired slide angle being achieved.

Thus, a significant feature of the present invention is that coating gypsum board paper with a friction reducing agent either before or after such paper has been converted into a gypsum board panel, can greatly reduce that paper's coefficient of friction. In this manner, the shear differential that forms between that panel's paper layer and the conveyor belts used to convey the panel during the lamination process, is reduced. Such reduction in shear differential can greatly reduce the number of rollups in the paper layer during lamination.

While particular embodiments of the gypsum board paper that reduces rollups during lamination and board comprising such paper have been shown and described, it will be appreciated by those skilled in the art that changes and modifications may be made thereto without departing from the invention in its broader aspects and as set forth in the following claims.

What is claimed is:

1. A process for reducing rollups of a paper layer of a gypsum board panel during lamination of a film to a paper layer on an opposite side of the gypsum board panel, comprising:

providing a laminator;

providing at least one sheet of gypsum board, each said sheet having a face paper layer and a backing paper layer, each said paper layer having an exterior surface having a coefficient of friction;

at least one of said face paper layer and said backing paper layer being treated on said exterior surface with an agent for reducing said coefficient of friction at a rate in the range of 0.01 lb/MSF–1.0 lb/MSF such that the gypsum board has a slide angle between 11.75 and 17.9 degrees;

providing a supply of the film and installing the film in said laminator; and feeding said at least one sheet of gypsum board through said laminator so that the film is laminated thereon;

whereby said coefficient of friction is reduced to a level to prevent rollups caused by said feeding of said sheet of gypsum board through said laminator while being maintained at a sufficiently high level to ensure efficient handling of said at least one sheet of gypsum board.

2. The process defined in claim 1, wherein said agent for reducing said coefficient of friction is selected from the group consisting of: paraffin wax emulsions wherein the paraffin wax has a melting point between 120 and 160° F.; microcrystalline wax emulsions wherein the microcrystalline wax has a melting point between 130 and 200° F.; long and branched chain aliphatic emulsions made from at least one of paraffin wax having a melting point between 120 and 160° F. and microcrystalline wax having a melting point between 130 and 200° F.; long and branched chain aliphatic dispersions made from at least one of petroleum-based and polyethylene-based products; hydrophobic silicone emulsions; hydrophobic silicone resins; polyurethane emulsions; polyurethane water dispersible colloids; styrene maleic anhydride copolymers; fluorochemical phosphates; flourochemicals polymerized with at least one of hydrophilic and hydrophobic co-monomer; complexes of long chain fatty acids having a carbon chain length from 10 to 18, and being based on one of chromium and aluminum; alkyl ketene dimer having a carbon chain length of 30–34; 85–99% hydrolized polyvinyl alcohols having a viscosity of less than 150 cp at 2% solution; methyl celluloses, having a viscosity of less than 150 cp at 2% solution; and natural gums with lubricating properties.

3. The process defined in claim 2, wherein said complexes of long chain fatty acids are formed of at least one of myristic acid and stearic acid.

4. The process defined in claim 2, wherein said complexes of long chain fatty acids have a carbon chain length from 12 to 16.

5. The process defined in claim 1, wherein said slide angle value is approximately 14°.

6. A process for manufacturing gypsum board having a paper layer on a face and back thereof, which reduces rollups of the back paper layer during lamination of a film to the face paper, comprising:

providing at least one sheet of gypsum board, each said sheet having a face paper layer and a backing paper layer, each said paper layer having an exterior surface;

providing a supply of an agent for reducing said coefficient of friction selected from the group consisting of: paraffin wax emulsions wherein the paraffin wax has a melting point between 120 and 160° F.; microcrystalline wax emulsions wherein the microcrystalline wax has a melting point between 130 and 200° F.; long and branched chain aliphatic emulsions made from at least one of paraffin wax having a melting point between 120 and 160° F. and microcrystalline wax having a melting point between 130 and 200° F.; long and branched chain aliphatic dispersions made from at least one of petroleum-based and polyethylene-based products; hydrophobic silicone emulsions; hydrophobic silicone resins; polyurethane emulsions; polyurethane water dispersible colloids; styrene maleic anhydride copolymers; fluorochemical phosphates; flourochemicals polymerized with at least one of hydrophilic and hydrophobic co-monomer; complexes of long chain fatty acids having a carbon chain length from 10 to 18, and being based on one of chromium and aluminum; alkyl ketene dimer having a carbon chain length of 30–34; 85–99% hydrolized polyvinyl alcohols having a viscosity of less than 150 cp at 2% solution; methyl celluloses, having a viscosity of less than 150 cp at 2% solution; and natural gums with lubricating properties; and applying a coating of said agent for reducing said coefficient of friction at a rate in the range of 0.01 lb/MSF–1.0 lb/MSF to said exterior surface of said at least one of the face paper layer and the back paper layer of said at least one sheet of gypsum board such that the gypsum board has a slide angle between 11.75 and 17.9 degrees;

whereby said coefficient of friction is reduced to a level to prevent rollups caused by feeding of said sheet of gypsum board through a laminator.

7. The process defined in claim 6, wherein said slide angle value is approximately 14°.

8. The process defined in claim 6, wherein said complexes of long chain fatty acids are formed of at least one of myristic acid and stearic acid.

9. A gypsum board designed to resist rolling up of a outer paper layer of the gypsum board in a laminator during lamination of a film in a laminator to an opposite side of the gypsum board panel, comprising:

a core of gypsum, having a face and a back, with at least one of said face and back being covered with a layer of paper, each said layer of paper having a coefficient of friction, and an exterior surface of at least one of said layers of paper having been treated with an agent for reducing said coefficient of friction at a rate in the range of 0.01 lb/MSF–1.0 lb/MSF such that the gypsum board has a slide angle between 11.75 and 17.9 degrees;

whereby said coefficient of friction is reduced to a level to prevent rollups caused by feeding of said sheet of gypsum board through the laminator;

said agent for reducing said coefficient of friction being selected from the group consisting of: paraffin wax emulsions wherein the paraffin wax has a melting point between 120 and 160° F.; microcrystalline wax emulsions wherein the microcrystalline wax has a melting point between 130 and 200° F.; long and branched chain aliphatic emulsions made from at least one of paraffin wax having a melting point between 120 and 160° F. and microcrystalline wax having a melting point between 130 and 200° F.; long and branched chain aliphatic dispersions made from at least one of petroleum-based and polyethylene-based products; hydrophobic silicone emulsions; hydrophobic silicone resins; polyurethane emulsions; polyurethane water dispersible colloids; styrene maleic anhydride copolymers; fluorochemical phosphates; flourochemicals polymerized with at least one of hydrophilic and hydrophobic co-monomer; complexes of long chain fatty acids having a carbon chain length from 10 to 18, and being based on one of chromium and aluminum; allyl ketene dimer having a carbon chain length of 30–34; 85–99% hydrolized polyvinyl alcohols having a viscosity of less than 150 cp at 2% solution; methyl celluloses, having a viscosity of less than 150 cp at 2% solution; and natural gums with lubricating properties.

10. The process defined in claim 9, wherein said complexes of long chain fatty acids are formed of at least one of myristic acid and stearic acid.

* * * * *